(12) United States Patent
Song et al.

(10) Patent No.: US 12,474,022 B2
(45) Date of Patent: Nov. 18, 2025

(54) DISTRIBUTED LOW ENERGY DYNAMIC THERMAL MANAGEMENT SYSTEM FOR SOLID MATTER PREVENTION AND CONTROL IN OIL AND GAS TRANSPORTATION PIPELINE

(71) Applicant: DALIAN UNIVERSITY OF TECHNOLOGY, Liaoning (CN)

(72) Inventors: Yongchen Song, Liaoning (CN); Cong Chen, Liaoning (CN); Yingying Cui, Liaoning (CN); Jiafei Zhao, Liaoning (CN); Mingjun Yang, Liaoning (CN); Weiguo Liu, Liaoning (CN); Yu Liu, Liaoning (CN); Yi Zhang, Liaoning (CN); Yan Qin, Liaoning (CN); Lanlan Jiang, Liaoning (CN); Zheng Ling, Liaoning (CN); Yubai Li, Liaoning (CN); Yuechao Zhao, Liaoning (CN); Lunxiang Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 92 days.

(21) Appl. No.: 17/781,331

(22) PCT Filed: May 25, 2021

(86) PCT No.: PCT/CN2021/095629
§ 371 (c)(1),
(2) Date: May 31, 2022

(87) PCT Pub. No.: WO2022/246621
PCT Pub. Date: Dec. 1, 2022

(65) Prior Publication Data
US 2024/0183500 A1    Jun. 6, 2024

(51) Int. Cl.
*F17D 1/18*      (2006.01)
*F16L 53/34*     (2018.01)
(Continued)

(52) U.S. Cl.
CPC ............... *F17D 1/18* (2013.01); *F16L 53/34* (2018.01); *F17D 3/01* (2013.01); *F17D 5/06* (2013.01)

(58) Field of Classification Search
CPC ...... F17D 1/18; F17D 3/01; F17D 5/06; F16L 53/34
(Continued)

(56) References Cited

U.S. PATENT DOCUMENTS

| 5,714,681 A * | 2/1998 | Furness ................. G01M 3/283 73/40.5 R |
| 2020/0258369 A1 * | 8/2020 | Davis ...................... G01M 3/16 |
| 2022/0400536 A1 * | 12/2022 | Allenspach ............... F17D 1/05 |

FOREIGN PATENT DOCUMENTS

| CN | 101871575 A | 10/2010 |
| CN | 201696796 U | 1/2011 |

(Continued)

*Primary Examiner* — Eric S Stapleton
*Assistant Examiner* — Yeong Juen Thong
(74) *Attorney, Agent, or Firm* — MUNCY, GEISSLER, OLDS & LOWE, P.C.

(57) ABSTRACT

A distributed low energy dynamic thermal management system for solid matter prevention and control in oil and gas transportation pipeline includes a pipeline data monitoring terminal, a current and an electric pulse control terminal, a land console, an electric heating terminal, a wiring flange, an oil and gas transportation pipeline, a valve structure. The system monitors the state of the pipeline in real time by the pipeline data monitoring terminal, and transmits the monitoring data to the current and electric pulse control terminal in real time, the current and electric pulse control terminal produces different thermal responses to the electric heating (Continued)

terminal according to the state in the tube, raises the temperature inside the tube by generating a continuous current, unblocks pipeline by generating high power electric pulse, so as to realize real-time monitoring and local temperature dynamic control of oil and gas transportation pipeline.

5 Claims, 3 Drawing Sheets

(51) Int. Cl.
*F17D 3/01* (2006.01)
*F17D 5/06* (2006.01)

(58) Field of Classification Search
USPC .................................................. 219/385, 391
See application file for complete search history.

(56) References Cited

FOREIGN PATENT DOCUMENTS

| | | | |
|---|---|---|---|
| CN | 202521148 U | | 11/2012 |
| CN | 202598136 U | | 12/2012 |
| CN | 202746950 U | | 2/2013 |
| CN | 204042309 U | | 12/2014 |
| CN | 105156893 A | | 12/2015 |
| CN | 206754808 U | | 12/2017 |
| CN | 108061246 A | | 5/2018 |
| CN | 108317396 A | | 7/2018 |
| CN | 211574495 U | | 9/2020 |
| CN | 112728273 A | | 4/2021 |
| DE | 102010053737 A1 | | 6/2012 |
| JP | 2010151764 A | * | 7/2010 |

* cited by examiner

DISTRIBUTED LOW ENERGY DYNAMIC THERMAL MANAGEMENT SYSTEM FOR SOLID MATTER PREVENTION AND CONTROL IN OIL AND GAS TRANSPORTATION PIPELINE

TECHNICAL FIELD

The invention belongs to the technical field of flowing fluid safety assurance in oil and gas transportation pipeline, and relates to a low energy consumption dynamic thermal management system for solid matter prevention and control in oil and gas transportation pipeline.

BACKGROUND ART (1) Formation Background of Solid Matter in Oil and Gas Transportation Pipeline:

In the process of oil and gas exploration and transportation, due to high pressure and low temperature conditions, it is easy to form gas hydrates and wax deposits and other matters to block pipelines, especially in pipeline valves or blind pipes used to provide maintenance services.

At present, there are two methods to prevent hydrate blockage in oil and gas transportation pipeline: heating method and inhibitor method. Among them, the heating method refers to heat the blockage position to make its temperature higher than the hydrate phase equilibrium temperature under the system pressure, so as to decompose the hydrate and remove the blockage. Heating method consumes a lot of energy to raise the temperature of the fluid and increase the cost of oil and gas exploration. In the current engineering application, the heating method mostly adopts the way of pipeline external heating, which has low heat utilization. The inhibitor method is to inject thermodynamic hydrate inhibitor into the pipeline to change the phase equilibrium condition of hydrate so as to decompose hydrate and remove the blockage, but the thermodynamic inhibitors are used in large quantities and expensive, which will affect the environment.

At present, methods to prevent wax deposition in pipelines comprise heating insulating method and pigging method. Similar to the hydrate unblocking principle, the heating method will consume a lot of energy when increasing the fluid temperature. The pig cleaning method may damage pipelines in the case of solid fouling, if a large number of refractory solid fouling cannot be effectively removed, the pig will be blocked.

Therefore, it is necessary to propose a solid unblocking method with high efficiency and low cost.

(2) Technical Background of Electric Pulse Heating:

The electric pulse is used to heat the bottom of solid matter directly contacted on the surface of the structure to make it fluidized, and the solid is automatically separated from the surface of the structure under the action of gravity and fluid thrust, so as to achieve high efficiency and energy conservation. This method consumes less than 1% of traditional energy consumption and 0.01% of the traditional time for unblocking because it only needs to heat the bottom of solid adhesive and uses the electric pulse to directly heat the electrothermal film coated on the structure surface.

(3) Technical Background of Electrothermal Layer

The electrothermal layer is a thin film serving as heating element with surface heating. Generally speaking, different processing methods are required to be selected according to the different heating materials. The electrothermal layer is mainly made of conductive materials, film-forming materials or membrane materials. Different conductive materials and film-forming substrates can form various electrothermal films. Meanwhile, there are various kinds of processing methods, some directly prepare the film on the heated carrier, the film formed on the carrier cannot be separated from the carrier. For example, after mixing conductive material and film-forming material into slurry, it is coated on the object to be heated for drying into film, or pyrolyzed and sprayed into film, etc. These processes are commonly used in inorganic coatings. Some are making electrothermal films into components, such as mixing the conductive material and film-forming material into slurry, drying and film-forming, and finally sticking it on the heated object by bonding. Some also adopt physical vapor deposition, vacuum spraying, ion spraying, sputtering and other methods to integrate the conductive material with the film substrate, or make the electrothermal film slurry into transfer paper.

Some electrothermal films have the dual effects of inhibiting solid attachment to the surface and generating heat to release adhesion. For example, carbon nanotube films can realize the reversible conversion between superhydrophobicity and superhydrophilicity, inhibit the adhesion of solids, and achieve efficient heat transfer without polluting the surface of the device when used as thermal conductive interface materials.

CONTENTS OF THE INVENTION

The purpose of the present invention is to propose a dynamic unblocking management system with low energy consumption based on electrical pulse unblocking technology for the solid matter plugging problem in oil and gas transportation pipelines.

In order to achieve the above purposes, the technical scheme of the invention is as follow:

A distributed low energy dynamic thermal management system for solid matter prevention and control in oil and gas transportation pipeline. The management system relies on a valve structure 7 connecting the oil and gas transportation pipeline to connect the internal and external structure of the pipeline structure in management system. By setting the management system in different positions of the pipeline, the distributed management of the oil and gas transportation pipeline is carried out and the real-time monitoring and local dynamic control of the internal state of the pipeline can be realized. The distributed low energy dynamic thermal management system comprises: a pipeline data monitoring terminal 1, a current and electric pulse control terminal 2, a land console 22, an electric heating terminal 3, a wiring flange 4, an oil and gas transportation pipeline 5, a valve structure 7.

The pipeline data monitoring terminal 1 is arranged outside the oil and gas transportation pipeline 5, the current and electric pulse control terminal 2 is arranged on the outside of oil and gas transportation pipeline 5, and the electric heating terminal 3 is arranged on the inner wall of oil and gas transportation pipeline 5. Add the wiring flange 4 at the valve structure 7 and set bolts 41 on the wiring flange 4 for sealing connection. The current and electric pulse control terminal 2 is connected with the an electrothermal layer 32 of the electric heating terminal 3 in the pipe by connecting wire 21, and connecting wire 21 passes through the wiring flange 4. The current and electric pulse control terminal 2 is connected with the pipeline data monitoring terminal 1 for data transmission. The management system can rely on the valve structure 7 as needed for distributed arrangement, thus implementing distributed management of the pipeline. And the electric heating terminal 3 is arranged on the inner wall of the pipeline, which can directly heat the pipe fluid and reduce unnecessary heat loss.

The pipeline data monitoring terminal 1 includes temperature sensing module 11, solid matter monitoring module 12 and pipeline leakage monitoring module 13, which are respectively used to monitor the internal temperature state of the pipeline, solid matter 6 (including hydrate, wax deposition, etc.) generation state and pipeline leakage state, and carry out distributed real-time monitoring of the internal state of the pipeline. A data representing the state in the pipe monitored by the pipeline data monitoring terminal 1 can be transmitted to the current and electric pulse control terminal 2 in real time, and the data can be transmitted from the current and electric pulse control terminal 2 to the land console 22 in real time, which can judge the state in the pipe according to the data fed back by pipeline data monitoring terminal 1.

The current and electric pulse control terminal 2 has the remote communication function with the land computer, which can operate in an automatic working mode and also can be manually controlled by the land console 22 to produce continuous current or instantaneous electric pulse. The parameters of current and electric pulse can be flexibly adjusted according to the need. When the current and electric pulse control terminal 2 receives the data feedback from the pipeline data monitoring terminal 1, the current heating or electric pulse heating is carried out to the electric heating terminal 3 according to the automatic control mode or the manual control mode, and the distributed dynamic thermal management of the internal state of the pipeline is carried out to realize the prevention and unblock of solid matter 6 in the pipeline.

The electric heating terminal 3 needs to be set on the inner wall of the pipeline when the oil and gas transportation pipeline 5 is prepared, including an insulating layer 31 and the electrothermal layer 32, the insulating layer 31 is set between the inner wall of the pipeline 5 and the electrothermal layer 32, which can prevent the current and heat from spreading outside the pipeline. The electric heating terminal 3 generates heat when receiving the current or electric pulse from the current and electric pulse control terminal 2, and directly heats the fluid in the pipeline on the electrothermal layer 32. The electrothermal layer 32 and the current and electric pulse control terminal 2 are connected by connecting wire 21 and wiring flange 4. The electrothermal layer 32 directly contact with the fluid in the pipe, which greatly improves heat utilization rate and environmental conditions in the pipe. The insulating layer 31 and the electrothermal layer 32 can be arranged as required in the oil and gas transportation pipeline 5 in any position for unblocking.

Furthermore, the connecting wire 21 is embedded in bolts 41 in advance in the actual construction process, and the construction difficulty is reduced by sealing process connection. The sealing and waterproof treatment should be carried out at the connection between bolts 41 and wiring flange 4.

Furthermore, the valve structure 7 of the oil and gas transportation pipeline 5 refers to the three-way valve or similar structure, in which two accesses are used for the connection of the pipeline, one access is connected with the additional wiring flange 4, and the connection of the internal and external structures of the management system pipeline is realized at the wiring flange 4.

Furthermore, the electrothermal layer 32 comprises various electrothermal films capable of generating heat when energized, such as indium tin oxide coating, graphene coating, carbon nanotube films, etc. The insulating layer 31 comprises various coatings or films capable of insulating functions; the two materials can be set on the inner wall of the pipeline in different ways according to the material of the electrothermal layer 32.

Furthermore, the land console 22 can operate in the automatic working mode for the current and electric pulse control terminal 2, and can also perform manual control operation by land console 22. Whether the automatic working mode or the manual control mode, the land console 22 can receive data in real time and monitor the state of the pipe.

Furthermore, the automatic working mode of the current and electric pulse control terminal 2 means that different responses can be automatically generated when the feedback data of the pipeline data monitoring terminal 1 are received by setting the parameter judgment mechanism in advance.

Furthermore, the communication function between the current and electric pulse control terminal 2 and the land console 22 includes real-time data monitoring and viewing function and the control function of current and electric pulse generation parameters.

Furthermore, the data transmission between the current and electric pulse control terminal 2 and the land console 22 can be carried out in different ways according to the material of the electrothermal layer, including wireless transmission and wired transmission. The wired transmission can be carried out by arranging data transmission lines along the pipeline line.

Furthermore, the current and electric pulse control terminal 2 and pipeline data monitoring terminal 1 need to be sealed and waterproof, and each connection of the connecting wire 21 needs to be sealed and waterproof.

A method for using a distributed low energy dynamic thermal management system for solid matter prevention and control in oil and gas transportation pipeline includes the following steps:

1) Set up the automatic working mode for the current and electric pulse control terminal 2, set up automatic judgment mechanism for pipe state, or adopt the manual control mode in land console 22;
2) The pipeline data monitoring terminal 1 feeds real-time monitoring data to the current and electric pulse control terminal 2 in real time;
3) The current and electric pulse control terminal 2 receive the feedback data in real time, and transmit the data to the land console 22 in real time, and send electric pulse or continuous current to the electric heating terminal 3 in the tube according to the automatic working mode or the manual control mode;
4) According to the automatic working mode or the manual control mode of the current and electric pulse control terminal 2, combining with the real-time data collected by pipeline data monitoring terminal 1, the data are processed in following ways:

Judging the temperature data monitored by the temperature sensing module 11 and the actual inhibitor addition in the tube, when the state of the tube is easy to generate solid matter, the current and electric pulse control terminal 2 generate continuous current. The fluid in the oil and gas transportation pipeline 5 is heated by the electrothermal layer 32 to realize a prevention function of solid matter 6 generation.

When solid matter monitoring module 12 detects a small amount of solid matter 6 in the oil and gas transportation pipeline 5, the current and electric pulse control terminal 2 can produce continuous current. The fluid in the oil and gas transportation pipeline 5 is heated by the electrothermal layer 32 to promote the decomposition of solid matter 6. When solid matter monitoring module 12 detects that the solid matter 6 is attached to the inner wall of oil and gas transportation pipeline 5, the current and electric pulse control terminal 2 generates high-power electric pulse; the solid matter 6 attached to the inner wall of the pipeline is instantaneously heated on the electrothermal layer 32, so that a bottom of a solid adhesive 61 melts, fall off from the wall of the pipe, avoiding mass accumulation of solid matter 6 and blockage of pipeline.

When the pipeline leakage monitoring module 13 monitors the pipeline leakage information, the signal is fed back to the current and electric pulse control terminal 2, and the current and electric pulse control terminal 2 transmits the signal to the land console 22, reminding a staff member to carry out maintenance treatment, and close their working mode to prevent the loss of current leakage.

The principle of electric pulse unblocking in the present invention is that, by using the principle of electric pulse heating, the electric pulse is sent to the conductive heating layer from the current and electric pulse control terminal 2, and the solid matter 6 attached to the wall is instantaneously heated by electric shock. Because short pulses are used to generate heat rather than applying it continuously, the thickness of the heated layer in the solid can be minimized. The heat is concentrated on a bottom portion of a solid adhesive 61, resulting in the melt of the bottom of solid adhesive 61. Falling off the pipe wall under the impact of water flow, the solid matter 6 has no place to attach and cannot block the pipe. The electric pulse heating method has high efficiency and low energy consumption, which greatly reduces the safe operation cost of equipment.

Comparing with the existing technology, the beneficial effects of the invention are as follows:

1) Based on the valve structure 7 used to connect the oil and gas transportation pipeline, the distributed management of the oil and gas transportation pipeline can be flexibly set up in the position where solid blockage is more likely to occur, which greatly reduces the management cost of the pipeline and effectively improves the management efficiency;
2) The introduction of electrical pulse unblocking method can remove the adhesion of solid matter 6 on the pipe wall with energy conservation and high efficiency, which significantly reduce the cost and time of unblocking.
3) The pipeline data monitoring terminal 1 of oil and gas transportation pipeline 5 is introduced to monitor the state of the pipeline in real time, the data is transmitted to the current and electric pulse control terminal 2 in real time and generate real-time thermal response. Without long-term heating the oil and gas transportation pipeline 5, the electricity cost can be significantly reduced.
4) The current and electric pulse control terminal 2 can combine different internal conditions to produce different thermal responses, which can generate continuous current to adjust the internal temperature to prevent the formation of solid matter 6, can generate high-power electrical pulse to unblock the pipeline, and can set up automatic or manual control working mode. The management system can be set or adjusted according to the actual engineering situation, which improves the engineering application of the management system.
5) The electrothermal layer 32 is arranged as heating element, which can be arranged into any required shape, and can be laid to any part of the oil and gas transportation pipeline 5 where is required to unblock, flexible and convenient;
6) The wiring flange 4 is set at the outlet of the valve or blind pipe to connect the internal and external circuits of the pipeline, which has strong practicability without destroying the original structure of the oil and gas transportation pipeline 5.
7) The invention sets the electric heating terminal 3 in the pipe, and adopt the dynamic thermal management mode of direct heating in the pipe. Compared with the unblocking mode of direct current heating with the heating layer on the outer wall of the pipe, the unnecessary heat loss is avoided, and the amount of inhibitor in the pipe in engineering application is reduced, so as to achieve the effects of low cost, low energy consumption and high unblocking efficiency.

In the figures: 1 represents the pipeline data monitoring terminal; 2 represents the current and electric pulse control terminal; 3 represents the electric heating terminal; 4 represents the wiring flange; 5 represents the oil and gas transportation pipeline; 6 represents the solid matter; 7 represents the valve structure.

11 represents the temperature sensing module; 12 represents the solid matter monitoring module; 13 represents the pipeline leakage monitoring module; 21 represents the connecting wire; 22 represents the land console; 31 represents the insulating layer; 32 represents the electrothermal layer; 41 represents the bolts; 61 represents a bottom of a solid adhesive.

MODE OF CARRYING OUT THE INVENTION

In order to make the purpose of the present invention, the technical scheme and its advantages clearer, the present invention is further explained and illustrated below in conjunction with the accompanying drawings and embodiment. The specific embodiment described here is used only to explain the present invention and is not meant to limit it.

Figure 1:
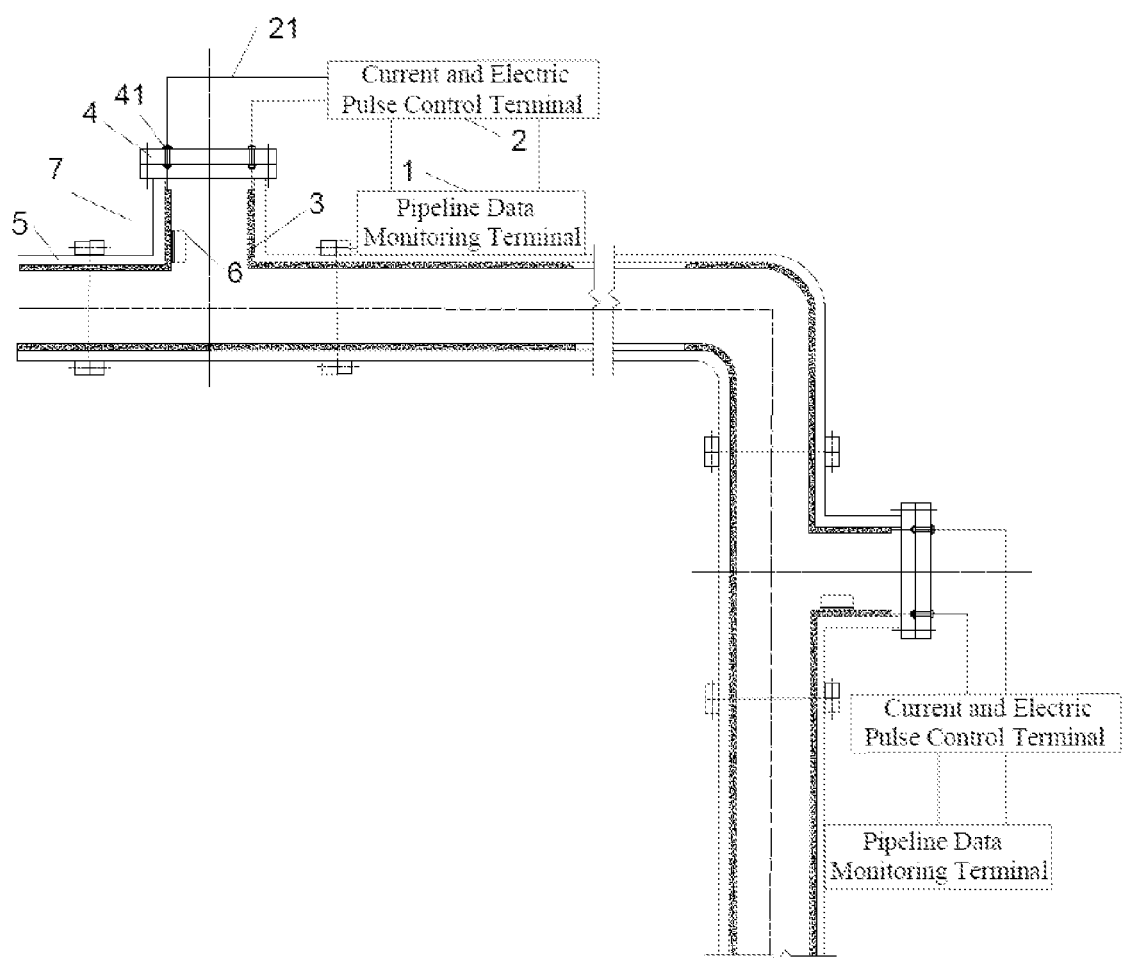
FIG. 1 is a structure diagram of the present embodiment.

Disclosed is a distributed low energy dynamic thermal management system for solid matter prevention and control in oil and gas transportation pipeline, as shown in FIG. 1. The management system includes the pipeline data monitoring terminal 1, the current and electric pulse control terminal 2, the land console 22, the electric heating terminal 3, the wiring flange 4, the oil and gas transportation pipeline 5, the valve structure 7. The pipeline data monitoring terminal 1 is arranged on the outside of the oil and gas transportation pipeline 5, the current and electric pulse control terminal 2 is arranged on the outside of the oil and gas transportation pipeline 5, the electrothermal terminal 3 is arranged on an inner wall of the oil and gas transportation pipeline 5, and the current and electric pulse control terminal 2 is connected to the electrothermal terminal 3 in the pipeline by an additional the wiring flange 4 at the valve structure 7. The management system can rely on the valve structure 7 for distributed arrangement as needed to implement distributed management of the pipeline, and the electrothermal terminal 3 is arranged on the inner wall of the pipeline, allowing to direct heat the fluid in pipeline and reducing unnecessary heat loss.

Figure 2:
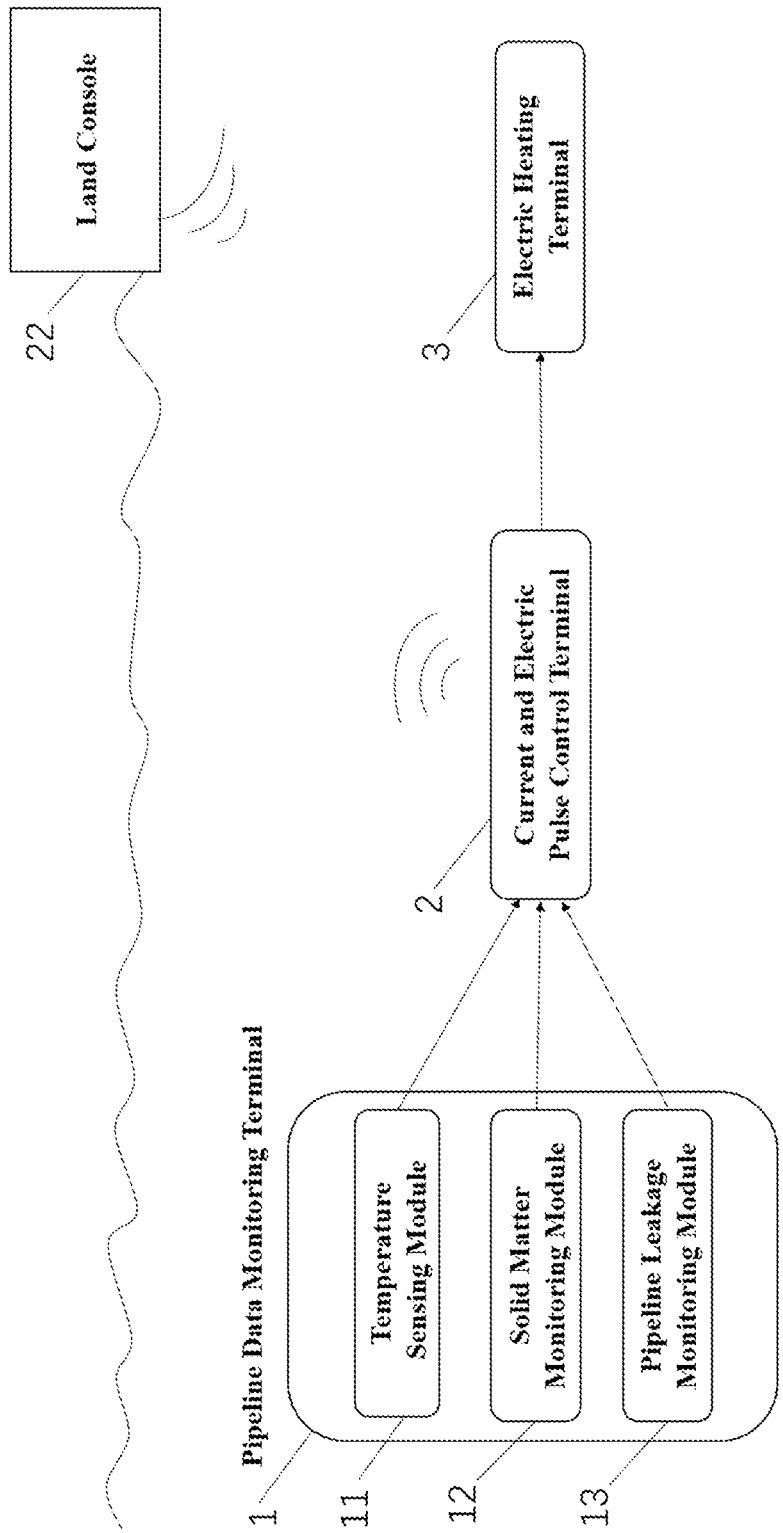
FIG. 2 is a schematic diagram of the principle of the present embodiment.

As shown in FIG. 2, the pipeline data monitoring terminal 1 includes temperature sensing module 11, solid matter monitoring module 12, and pipeline leakage monitoring module 13; the temperature sensing module 11 can use a thermocouple to measure the temperature. The solid matter monitoring module 12 can be arranged on the outer wall of the pipeline to realize its monitoring function. The pipeline leakage monitoring module 13 can use optical fiber sensing technology to realize its monitoring function. When the pipeline data monitoring terminal 1 monitors the status inside the pipeline, it can transmit the data to the current and electric pulse control terminal 2 in real time, and the current and electric pulse control terminal 2 can also transmit the data to the land console 22 in real time, and the automatic working mode can be set in the current and electric pulse control terminal 2. The manual control operation can also be performed by land console 22. According to the data feedback from the pipeline data monitoring terminal 1, the status of the pipeline can be judged, the current and electric pulse control terminal 2 can issue continuous current or electric pulse with different parameters to the electric heating terminal 3 for temperature adjustment or unblock operation of the pipeline status. Whether in the automatic working mode or the manual control mode, the land console 22 can receive data in real time and monitor the status inside the pipeline. The land console 22 and the current and electric pulse terminal 2 can transmit data in various ways, including wireless transmission, wired transmission. The wired transmission method can be used to transmit data by arranging data transmission lines along the pipeline.

Figure 3:
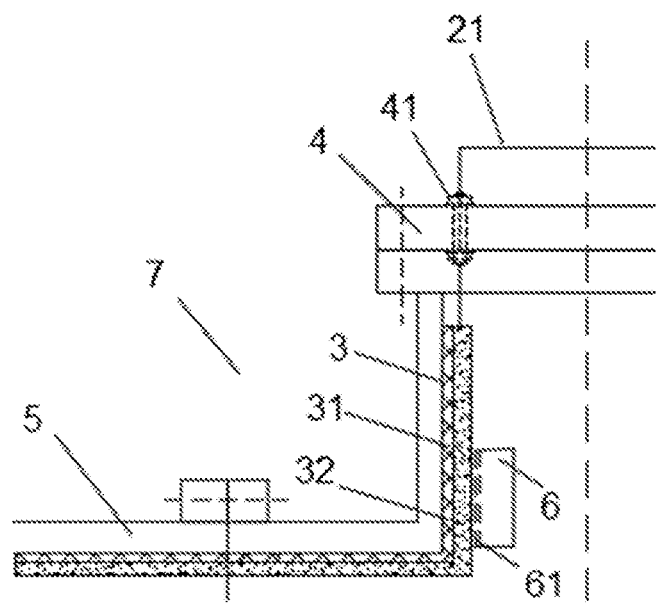
FIG. 3 is a structure diagram of the electric heating terminal inside the pipeline wall.

As shown in FIG. 3, insulation paint is selected to cover the inner wall of oil and gas transportation pipeline 5 for insulating layer 31, and indium tin oxide of 0.3 micron thickness is selected to be coated on the surface of the electrothermal layer 32, which can greatly reduce heat loss when heating the fluid in the pipe.

As shown in FIG. 3, the wiring flange 4 is flanged to the valve structure 7, and the bolts 41 are set on the wiring flange 4 to seal the connection, and the current and electric pulse control terminal 2 is connected to the electrothermal layer 32 in the pipeline by the connecting wire 21. The connecting wire 21 is embedded in bolts 41 in advance in the actual construction process, which is connected with bolts 41 by sealing process to reduce the construction difficulty. Sealing waterproof treatment should be considered at the connection between the bolts 41 and the wiring flange 4.

As shown in FIG. 3, when the electric pulse is used to unblock the pipe, the electric pulse is transmitted through the connecting wire 21 to the electrothermal layer 32, which transiently heats the solid matter 6, and a bottom portion of a solid adhesive 61 melt, causing the solid matter 6 to fall off into the pipeline, reducing the attachment of solid matter to the pipeline wall, thus reducing the accumulation of solid matter, with low energy consumption, fast time, and high unblock efficiency.

The working process of the present embodiment is as follow:
① Set up the automatic working mode for the current and electrical pulse control terminal 2, set up automatic judgement mechanism for internal state of the tube, or use the manual control mode at the land console 22.
② The pipeline data monitoring terminal 1 provides real-time feedback of the real-time monitoring data to the current and electrical pulse control terminal 2.
③ The current and electric pulse control terminal 2 receives the feedback data in real time, and transmits the data to the land console 22 in real time. According to the automatic working mode or the manual control mode, the electric pulse or continuous current is sent to the electric heating terminal 3 in the pipeline.
④ In the automatic working mode or the manual control mode, judgment is made based on the actual inhibitor addition in the pipeline and the temperature data in the pipeline monitored by the temperature sensing module 11 in the oil and gas transportation pipeline 5, when the pipeline state is more likely to generate solid matter 6, the signal of the pipeline data monitoring terminal 1 is fed back to the current and the electric pulse control terminal 2, and the current and the electric pulse control terminal 2 generates continuous current. The fluid in the oil and gas transportation pipeline 5 is heated by the electrothermal layer 32 to realize a prevention function of solid matter 6.
⑤ When the solid matter monitoring module 12 detects the formation of a small amount of solid matter 6 in the pipeline, the current and electric pulse control terminal 2 may generate a continuous current to heat the fluid in the pipeline on the electrothermal layer 32, promoting the decomposition of the solid matter 6.
⑥ When the solid matter monitoring module 12 detects that the solid matter 6 is attached to the inner wall of the pipeline, the current and electric pulse control terminal 2 can generate high power electric pulse to heat the solid matter 6 attached to the pipe wall with instantaneous impact on the electrothermal layer 32, so that the bottom portion of a solid adhesive 61 melts and falls off from the pipeline wall to avoid mass accumulation of solid matter 6 and blockage of pipeline.
⑦ When the pipeline leakage monitoring module 13 detects the pipeline leakage information, it feeds the signal to the current and electric pulse control terminal 2, and the current and electric pulse control terminal 2 transmits the signal to the land console 22 to remind a staff member to carry out maintenance treatment and turn off its own working mode to prevent the loss of current leakage.

The above embodiment only express the mode of implementation of the present invention, but it should not be understood as a limitation of the scope of the present invention patent, and it should be pointed out that for technicians in this field, some deformations and improvements can be made without breaking away from the concept of the invention, which are all within the scope of the protection of the invention.

The invention claimed is:

1. A distributed low energy dynamic thermal management system for solid matter prevention and control in oil and gas transportation pipeline, wherein the distributed management of the oil and gas transportation pipeline is carried out by setting the management system in different positions of the pipeline, and the real-time monitoring and local dynamic control of pipeline internal state can be realized; the low energy dynamic thermal management system comprises: a pipeline data monitoring terminal, a current and electric pulse control terminal, a land console, an electric heating terminal, a wiring flange, an oil and gas transportation pipeline, and a valve structure;

the pipeline data monitoring terminal is arranged outside the oil and gas transportation pipeline, the current and electric pulse control terminal is arranged outside the oil and gas transportation pipeline, the electric heating terminal is arranged on an inner wall of the oil and gas transportation pipeline, add the wiring flange on the valve structure and install a plurality of bolts in the wiring flange, the current and electric pulse control terminal is connected to an electrothermal layer of the electric heating terminal in the pipeline by connecting wire, wherein the connecting wire passes through the wiring flange; the current and electric pulse control terminal is connected with the pipeline data monitoring terminal for data transmission; the management system relies on the valve structure for distributed layout;

the pipeline data monitoring terminal comprises: a temperature sensing module, a solid matter monitoring module and a pipeline leakage monitoring module, which are used to monitor the internal temperature, the generation of solid matter and pipeline leakage respectively, so as to carry out the distributed real-time monitoring of the internal state of the pipeline; the data that characterize the state of the pipe monitored by the pipeline data monitoring terminal can be transmitted to the current and electric pulse control terminal in real time, the current and electric pulse control terminal transmits the data to the land console in real time; the current and electric pulse control terminal operate in an automatic working mode and a manual control mode: the automatic working mode includes the current and electric pulse control terminal automatically judges the state of the pipe according to the data fed back from the pipeline data monitoring terminal, and automatically generates different thermal responses to the electric heating terminal; the manual control mode refers to that a staff member judges the state of the pipe by the land console, indicating that the current and electric pulse control terminal to generate thermal responses; the thermal responses mean a current heating or an electric pulse heating, in which current heating is used to increase the temperature in the pipe and realize a function for preventing solid matter generation in the pipe, and electric pulse heating is used to realize a function for unblocking solid matter in pipeline;

the electric heating terminal is arranged on the inner wall of the pipeline when preparing the oil and gas transportation pipeline, including an insulating layer and the electrothermal layer, the insulating layer is set between the inner wall of the pipeline and the electrothermal layer, heat is generated when the electric heating terminal receives current or pulse from the electric pulse control terminal, the heat passes through the electrothermal layer to heat the fluid or solid matter in the pipe; the electrothermal layer comprises various electrothermal films capable of generating heat when energized;

when solid matter monitoring module detects that the solid matter is attached to the inner wall of oil and gas transportation pipeline, the current and electric pulse control terminal generates high-power electric pulse; the solid matter attached to the wall is instantaneously heated on the electrothermal layer, so that the bottom of solid adhesive melt, fall off from the wall of the pipe, avoiding mass accumulation of solid matter and blockage of pipeline;

wherein the valve structure includes a three-way valve, two of the accesses are used for pipeline connections, one access is connected to the wiring flange, and the connection of the internal and external structure of the pipeline in the management system is realized at the wiring flange.

2. The distributed low energy dynamic thermal management system for solid matter prevention and control in oil and gas transportation pipeline according to claim 1, wherein the current and electric pulse control terminal has a remote communication function with the land console, and the communication function comprises: a real-time data monitoring and view function, and a current and electric pulse parameters control function.

3. The distributed low energy dynamic thermal management system for solid matter prevention and control in oil and gas transportation pipeline according to claim 1, wherein the insulating layer and the electrothermal layer can be arranged in any position that needs to be unblocked in the oil and gas transportation pipeline.

4. The distributed low energy dynamic thermal management system for solid matter prevention and control in oil and gas transportation pipeline according to claim 1, wherein the connecting wire is embedded in the bolts in advance during the actual construction process and connected with the bolts by sealing process.

5. The distributed low energy dynamic thermal management system for solid matter prevention and control in oil and gas transportation pipeline according to claim 1, wherein the current and electric pulse control terminal and the pipeline data monitoring terminal are sealed and waterproof; each connection of the connecting wire are sealed and waterproof; the joints of the bolts and the wiring flange is sealed and waterproof.

\* \* \* \* \*